US012571489B2

(12) United States Patent
Worsley

(10) Patent No.: US 12,571,489 B2
(45) Date of Patent: Mar. 10, 2026

(54) SPOOLING AND INSTALLING TRACE-HEATED PIPELINES OF PIPE-IN-PIPE CONFIGURATION

(71) Applicant: Subsea 7 Limited, Sutton (GB)

(72) Inventor: Christopher James Worsley, London (GB)

(73) Assignee: SUBSEA 7 LIMITED, Sutton (GB)

( * ) Notice: Subject to any disclaimer, the term of this patent is extended or adjusted under 35 U.S.C. 154(b) by 938 days.

(21) Appl. No.: 17/786,287

(22) PCT Filed: Dec. 18, 2020

(86) PCT No.: PCT/EP2020/087277
§ 371 (c)(1),
(2) Date: Jun. 16, 2022

(87) PCT Pub. No.: WO2021/123350
PCT Pub. Date: Jun. 24, 2021

(65) Prior Publication Data
US 2023/0022292 A1 Jan. 26, 2023

(30) Foreign Application Priority Data
Dec. 18, 2019 (GB) ..................................... 1918765

(51) Int. Cl.
*F16L 1/20* (2006.01)
*F16L 9/18* (2006.01)
(Continued)

(52) U.S. Cl.
CPC ................. *F16L 1/203* (2013.01); *F16L 9/18* (2013.01); *F16L 17/10* (2013.01); *F16L 25/01* (2013.01);
(Continued)

(58) Field of Classification Search
CPC ... F16L 1/203; F16L 9/18; F16L 17/10; F16L 25/01; F16L 39/005; F16L 59/065; F16L 59/143; F16L 59/16
See application file for complete search history.

(56) References Cited

U.S. PATENT DOCUMENTS 5,072,622 A * 12/1991 Roach ................. F16L 58/1036
73/40.5 R
6,142,707 A * 11/2000 Bass ........................ H05B 3/06
137/341
(Continued)

FOREIGN PATENT DOCUMENTS

FR 2 746 891 A1 10/1997
FR 2 978 006 A1 1/2013
(Continued)

OTHER PUBLICATIONS

International Preliminary Report on Patentability received in corresponding International Application No. PCT/EP2020/087277 dated Nov. 22, 2021.
(Continued)

*Primary Examiner* — Benjamin F Fiorello
(74) *Attorney, Agent, or Firm* — MATTINGLY & MALUR, PC

(57) ABSTRACT

A transition section disposed between successively spoolable, electrically trace-heated PiP pipelines comprises an inner pipe, an outer pipe, and an annulus between the inner and outer pipes. The annulus contains heating cables that extend longitudinally between annuli of the pipelines and longitudinally spaced seals that, when deactivated, allow fluid communication between the annuli of the pipelines and, when activated, isolate the annuli of the pipelines from each other. Longitudinally spaced blocking plates close the lumen of the inner pipe and define an inner chamber between them. Longitudinally spaced openings penetrate a (Continued)

wall of the inner pipe at locations longitudinally inboard of the blocking plates and the seals. The openings effect fluid communication between the annulus and the inner chamber and also define a diversion path for the heating cables that extends from the annulus to the inner chamber and back to the annulus.

30 Claims, 3 Drawing Sheets

(51) Int. Cl.

| | |
|---|---|
| *F16L 17/10* | (2006.01) |
| *F16L 25/01* | (2006.01) |
| *F16L 39/00* | (2006.01) |
| *F16L 59/065* | (2006.01) |
| *F16L 59/14* | (2006.01) |
| *F16L 59/16* | (2006.01) |

(52) U.S. Cl.
CPC ........... *F16L 39/005* (2013.01); *F16L 59/065* (2013.01); *F16L 59/143* (2013.01); *F16L 59/16* (2013.01)

(56) References Cited

U.S. PATENT DOCUMENTS

| | | | | |
|---|---|---|---|---|
| 6,292,627 | B1 * | 9/2001 | Gilchrist, Jr. | ........... F16L 53/37 |
| | | | | 392/311 |
| 6,349,976 | B1 * | 2/2002 | Taylor, Jr. | ............... F16L 59/14 |
| | | | | 285/47 |
| 9,822,905 | B2 | 11/2017 | Bonigen et al. | |
| 2004/0040716 | A1 * | 3/2004 | Bursaux | ................ E21B 36/005 |
| | | | | 166/57 |
| 2004/0060693 | A1 * | 4/2004 | Bass | ........................ F16L 53/37 |
| | | | | 166/57 |
| 2014/0116556 | A1 | 5/2014 | Critsinelis et al. | |
| 2020/0408069 | A1 * | 12/2020 | Koroluk | ................ E21B 17/006 |

FOREIGN PATENT DOCUMENTS

| | | | |
|---|---|---|---|
| GB | 2492883 | A | 1/2013 |
| GB | 2526831 | A | 12/2015 |
| GB | 2534952 | A | 8/2016 |
| WO | 93/08422 | A1 | 4/1993 |
| WO | 97/37166 | A1 | 10/1997 |
| WO | 02/16732 | A1 | 2/2002 |
| WO | 03/102357 | A1 | 12/2003 |
| WO | 2014/029644 | A1 | 2/2014 |
| WO | 2017/085147 | A1 | 5/2017 |

OTHER PUBLICATIONS

United Kingdom Combined Search and Examination Report received in corresponding United Kingdom Application No. GB1918765.7 dated Aug. 27, 2020.

International Search Report and Written Opinion received in corresponding International Application No. PCT/EP2020/087277 mailed Apr. 13, 2021.

* cited by examiner

SPOOLING AND INSTALLING
TRACE-HEATED PIPELINES OF
PIPE-IN-PIPE CONFIGURATION

This invention relates to spooling and installing trace-heated subsea pipelines that have a pipe-in-pipe (PiP) configuration. The invention is particularly concerned with reel-lay operations in which two or more such pipelines are spooled successively onto a reel of a pipelaying vessel.

Reel-lay operations involve winding or spooling a continuous pipe formed of welded elements onto a reel of a pipelaying vessel, to be unwound or unspooled subsequently during pipelaying at sea. Fabrication and spooling of the pipe typically take place at a spoolbase that the vessel visits when necessary for loading.

It is also possible for a pipe to be wound onto an intermediate storage reel after fabrication at a spoolbase, to be unwound subsequently from the storage reel and simultaneously wound onto a reel of a pipelaying vessel. The invention encompasses this possibility.

Nominally rigid pipes have enough flexibility to be bent if a minimum bend radius is observed. When spooling, bending extends beyond elastic limits into plastic deformation of the pipe that must be recovered by subsequent straightening processes during laying.

Bending deformation of a pipe upon spooling, unspooling and straightening develops considerable stresses and strains in the pipe wall, including ovalisation in transverse cross-section. This is a particular challenge with PiP pipelines that comprise an inner flowline pipe spaced from a concentric outer carrier pipe to define a thermally-insulating annulus between them.

Typically, thermally-insulating material such as microporous insulation is disposed in the annulus of a PiP pipeline; it is also known to draw down a partial vacuum in the annulus, as described in WO 97/37166 and GB2534952, or to inject an insulating gas to reduce transmission of heat through the annulus. FR 2746891 also describes a PiP pipeline that has a layer of microporous insulation and a partial vacuum in the annulus. WO 03/102357 describes a PiP assembly that has a dedicated drawdown port through a wall of the outer pipe or in a bulkhead that joins the inner and outer pipes.

PiP pipelines such as these offer high-performance thermal insulation and so are often used in the subsea oil and gas industry. Their double-walled construction also enhances mechanical strength and leak protection. PiP pipelines may, for example, be used as 'tie-backs' to transport crude oil and/or natural gas from a subsea wellhead across the seabed on the way to the surface. Commonly, in offshore locations, the oil and/or gas then flows up a riser from the seabed to the surface to undergo treatment and temporary storage at a surface installation. A PiP pipeline may also serve as a riser.

Oil and gas are present in subterranean formations at elevated temperature and pressure, which may be increased by the injection of fluids such as steam. On production of the oil or gas, the produced fluid emerges from the wellhead and enters a subsea pipeline in a multi-phase state.

During subsequent transportation along the pipeline, the temperature and pressure of the produced fluid have to be kept high enough to ensure a sufficient flow rate across the seabed and up the riser. Thus, various measures are taken to ensure that the internal temperature of the pipeline remains high despite thermal exchange with the surrounding seawater, which is invariably much colder.

Low temperature increases the viscosity of the produced fluid and promotes precipitation of solid-phase materials, namely waxes and asphaltenes in crude oil and hydrates in natural gas. Such solid-phase materials tend to deposit on the inner wall of the pipeline and may eventually cause plugs, which will interrupt production. Aside from the high cost of lost production, plugs are difficult and expensive to remove and can even sever the pipeline.

In addition, an oil or gas field must occasionally be shut down for maintenance. When production restarts, temperature within the pipeline must be increased quickly so that no plugs will form.

The challenges of thermal management increase as subsea pipelines become longer. In this respect, there is a trend toward longer tie-backs as oil and gas reserves are being exploited in increasingly challenging locations.

Designers of subsea pipelines have adopted both passive and active approaches to thermal management, either individually or in combination. A standard PiP pipeline is an example of a passive thermal management system, in which the flowline is thermally insulated to retain heat in fluids carried by the pipeline. Conversely, active thermal management systems add heat to the pipeline. For example, heat may be added by thermal exchange with hot fluids flowing along or around the pipeline. In an alternative approach, heat may be added by electrical heating systems that comprise elongate heating elements such as wires.

As a common example of active thermal management, a trace heating system typically employs resistive electrical wires running along, and in thermal contact with, the outer surface of a steel flowline pipe. Heat produced by passing an electric current along the wires is conducted through the pipe wall to the production fluid flowing within. Examples of electrically trace-heated flowlines are disclosed in WO 02/16732 and GB2534952. A further example of an electrically trace-heated flowline is described in US2014116556, in which the inner pipe is formed of a flexible material.

Electrically trace-heated PiP places resistive electrical wires in the annulus of the pipeline, in thermal contact with the outer surface of the inner pipe. Thus, electrically trace-heated PiP employs a combination of passive and active thermal management measures to manage the temperature of production fluids particularly effectively. GB 2492883, WO 2014/029644 and FR 2978006 disclose typical electrically trace-heated PiP flowline sections.

To reduce expense by minimising installation and transportation time during reel-lay operations, it is sometimes convenient to spool two or more pipelines successively end-to-end onto the same reel. For example, a transition piece may be welded to the facing ends of the pipelines to form an interface between the pipelines. The pipelines are then unspooled successively from the reel and separated by cutting through the interface, to be lowered separately to the seabed when an installation vessel is at the appropriate offshore installation sites. An example of such a system is disclosed in WO93/08422.

Whilst successive spooling of pipelines can be advantageous, it is particularly challenging to perform with electrically trace-heated PiP pipelines. For example, there is a need to monitor the integrity of the heating elements along their full length, across the end-to-end connection from one pipeline to the next. Monitoring has to be performed on a continuous basis as the pipelines distort during spooling and so present a risk of crushing the heating elements between the inner and outer pipes.

Successive spooling of electrically trace-heated PiP pipelines is especially challenging where a partial vacuum is drawn down in the annulus. Once a partial vacuum has been drawn down, it is important to maintain that reduced pressure by combatting leakage of air back into the annulus, hence avoiding the need to repeat the drawdown operation to correct the pressure. In this respect, time may be at a premium because drawdown operations could impact the critical path during pipeline fabrication and installation.

Drawdown operations may become particularly prolonged if they have to be performed separately on each successively-spooled pipeline. Also, repeating the drawdown operation may be impossible after a first pipeline has been spooled onto a reel and is inaccessible under the coils of a second pipeline that is spooled subsequently onto the reel.

Maintaining reduced gas pressure and electrical integrity in the annulus of a PiP structure is also challenging when it is necessary to separate successively-spooled PiP pipelines, and hence to cut through the annulus.

WO 2017/085147 discloses various temporary connection bulkheads for successively-spooled PiP pipelines but makes no provision for electrically-heated pipes. Similarly, U.S. Pat. No. 9,822,905 teaches how to deal with low pressure but does not provide for electrical continuity. Also, U.S. Pat. No. 9,822,905 is concerned with J-lay and S-lay operations, in which shorter sections of pipeline are welded together aboard an installation vessel to fabricate the pipeline offshore.

Against this background, the invention resides in electrically trace-heated pipe-in-pipe pipelines joined end-to-end via a transition section. The transition section comprises: an inner pipe and an outer pipe spaced radially from the inner pipe; an annulus defined between the inner and outer pipes, the annulus of the transition section containing heating cables that extend longitudinally between annuli of the pipelines and also containing longitudinally-spaced seals that are switchable between a deactivated state to effect fluid communication between the annuli of the pipelines and an activated state to isolate the annuli of the pipelines from each other; longitudinally-spaced blocking plates that close a lumen of the inner pipe and define an inner chamber between them; and longitudinally-spaced openings that penetrate a tubular wall of the inner pipe at locations longitudinally inboard of the blocking plates and the seals to effect fluid communication between the annulus of the transition section and the inner chamber and to define a diversion path for the heating cables that extends from the annulus of the transition section to the inner chamber and back to the annulus of the transition section.

Conveniently, the same openings effect said fluid communication between the annulus of the transition section and the inner chamber and define the diversion path for the heating cables. For example, the openings may be oversized relative to the heating cables to allow said fluid communication around the heating cables extending though the openings.

At least one data cable may extend beside the heating cables between the annuli of the pipelines along the diversion path via the inner chamber.

The seals may be inflatable seals that are deflated in the deactivated state to allow bypass of fluid along the annulus of the transition section and are inflated in the activated state to close the annulus of the transition section.

The transition section may, for example, be implemented by a transition piece that is joined to facing ends of the pipelines. In that case, if the pipelines differ from each other in diameter, the transition piece may taper or step down in diameter from a larger diameter at one end to a smaller diameter at an opposed end.

The annulus of the transition section may contain an activation system for activating the seals. In that case, a port may extend though a tubular wall of the outer pipe to power the activation system. Also, activation links may extend longitudinally within the annulus of the transition section between the activation system and the seals.

Blocking rings may close the annulus of the transition section at locations longitudinally inboard of the openings to define an outer chamber between the blocking rings that is isolated from the inner chamber. The outer chamber could contain the activation system for activating the seals, in which case the activation links may extend through the blocking rings.

The pipelines may further comprise a monitoring system that is connected to the heating cables at an end of the combined length of the pipelines. When the pipelines are spooled together on a reel in succession, the monitoring system may be connected to the heating cables at a leading end coupled to the reel or at a trailing end remote from the reel.

A drawdown system may be in fluid communication with the annulus of one of the pipelines at an end of the combined length of the pipelines. When the pipelines are spooled together on a reel in succession, the drawdown system may be connected to that annulus at a leading end coupled to the reel or at a trailing end remote from the reel.

The inventive concept also extends to a method of preparing electrically trace-heated pipe-in-pipe pipelines connected end-to-end via a transition section. The transition section comprises a radially inner pipe and a radially outer pipe that are connected to, or continuations of, radially inner and outer pipes of the pipelines respectively. The method comprises drawing down a partial vacuum in annuli of the pipelines when the annuli are in mutual fluid communication via an inner chamber in the radially inner pipe of the transition section, which inner chamber is isolated from the radially inner pipes of the pipelines. The partial vacuum may be drawn down before, during or after spooling the pipelines and the transition section onto a reel.

The method may further comprise: unspooling a first of the pipelines and the transition section from the reel; activating longitudinally-spaced seals in an annulus of the transition section to isolate the annuli of the pipelines from the inner chamber and from each other, each of the annuli of the pipelines thereby separately capturing the drawn-down partial vacuum; and cutting through the transition section at one or more longitudinal positions between the seals to separate the pipelines from each other.

Access for activating the seals may be provided by cutting or boring into the radially outer pipe of the transition section; alternatively, an external source may be connected to a port in a radially outer pipe of the transition section to activate the seals.

Blocking plates may be removed from the radially inner pipe of the transition section, which blocking plates define ends of the inner chamber. Conveniently, the blocking plates may be removed by cutting through the radially inner pipe of the transition section.

The integrity of cables of the pipelines may be monitored continuously while spooling the pipelines and the transition section onto a reel and while unspooling the pipelines and the transition section from the reel. For example, electrical current or data signals may be conveyed along the cables via the inner chamber in the radially inner pipe of the transition section. The cables of at least one of the pipelines may be cut before effecting a star end connection between them.

A termination head may be welded to a cut end of a first of the pipelines to be unspooled. Similarly, an initiation head may be welded to a cut end of a second of the pipelines to be unspooled. The first pipeline may be abandoned on the seabed before unspooling a second of the pipelines and installing the second pipeline on the seabed at a location different to the first pipeline.

By virtue of the invention, low pressure or partial vacuum initially drawn down in conjoined PiP pipelines does not require re-pumping. Conveniently, drawdown can be performed from a single location after spooling of the conjoined pipelines, most conveniently from the free trailing end of the conjoined pipelines that is opposed to the remote end on the reel. Also, electrical continuity of cables between the remote end and the trailing end of the conjoined pipelines, whether those cables are heating elements or power or data cables, is ensured during the whole process of spooling, unspooling and straightening. This allows real-time continuous monitoring of the integrity of the cables.

Embodiments of the invention provide a transition pipe section for temporarily connecting two distinct electrically trace-heated PiP pipeline sections each comprising an inner pipeline and an outer pipeline. The transition pipe section comprises an outer pipe welded to the respective outer pipes of the two outer pipeline sections and an inner pipe welded to the respective inner pipes of the two inner pipeline sections.

The inner pipe and the outer pipe define an annulus between them. The annulus contains air or other gas at low pressure, and at least one expandable seal. The annulus may also contain a means for energising the expandable seal. The annulus contains electrical cables and may also contain one or more fibre-optic cables.

The inner pipe comprises longitudinally-spaced holes defining a middle section between the longitudinally-spaced holes and an end section outboard of the holes, so that cables in the annulus of a first pipeline section are connected to cables in the annulus of a second pipeline section via cables running inside the inner pipe in the middle section, through the holes, and into the annulus in the end sections. Inner blocking plates may seal each end section of the inner pipe.

Annulus blocking plates may seal the annulus around the middle section of the inner pipe. For example, the middle section may comprise an H-section bulkhead that is a monolithic forged piece comprising a section of inner pipe, a section of outer pipe and a wall connecting the inner and outer sections that serves as an annulus blocking plate.

The expandable seal may be an inflatable seal, in which case the energising means may comprise pneumatic hoses. An expandable seal may be located at each end of the transition section.

The diameters of the first and second pipeline sections may be the same or may be different. In the latter case, the diameter of the transition section may vary between the diameter of the first pipeline section and the corresponding diameter of the second pipeline section.

Embodiments of the invention also implement a method to separate two distinct electrically trace-heated PiP pipeline sections connected by a transition pipe section as above, where the annulus contains gas at a low pressure. The method comprises: expanding the expandable seals; cutting out the middle section of the transition pipe section; and terminating the cables of the two pipeline sections at their respective ends by star end connections.

The expansion step may comprise opening a port through the outer pipe or opening a bore through the outer pipe between the two annulus blocking plates, and inflating the seals. The method may also comprise removing the inner blocking plates and connecting each end of the two distinct electrically trace-heated pipe-in-pipeline sections to a termination or initiation structure.

Embodiments of the invention also implement a method to install two distinct electrically trace-heated PiP pipeline sections connected by a transition pipe section as above and spooled on the same reel, the method comprising: partially installing the first pipeline section from a pipelaying vessel; separating the two pipeline sections; welding a termination head or structure to the first pipeline section; abandoning the first pipeline section; welding an initiation head or structure to the second pipeline section; moving the vessel; and installing the second pipeline section.

All of the methods of the invention may comprise monitoring the cables, preferably continuously.

In summary, the invention provides a transition section disposed between successively-spoolable electrically trace-heated PiP pipelines. The transition section comprises an inner pipe, an outer pipe, and an annulus between the inner and outer pipes. The annulus contains heating cables that extend longitudinally between annuli of the pipelines and longitudinally-spaced seals that, when deactivated, allow fluid communication between the annuli of the pipelines and, when activated, isolate the annuli of the pipelines from each other. Longitudinally-spaced blocking plates close the lumen of the inner pipe and define an inner chamber between them.

Longitudinally-spaced openings penetrate a wall of the inner pipe at locations longitudinally inboard of the blocking plates and the seals. The openings effect fluid communication between the annulus and the inner chamber and also define a diversion path for the heating cables that extends from the annulus to the inner chamber and back to the annulus.

In order that the invention may be more readily understood, reference will now be made, by way of example, to the accompanying drawings in which:

FIG. 1 is a schematic side view in longitudinal section of a transition section of the invention disposed at an interface between conjoined electrically trace-heated PiP pipelines;

FIG. 2 corresponds to FIG. 1 but shows a portion of outer pipe of the transition removed to allow access for sealing the annulus of the pipelines;

FIG. 3 corresponds to FIG. 1 but shows an alternative approach to sealing the annulus;

Figures 1, 2:
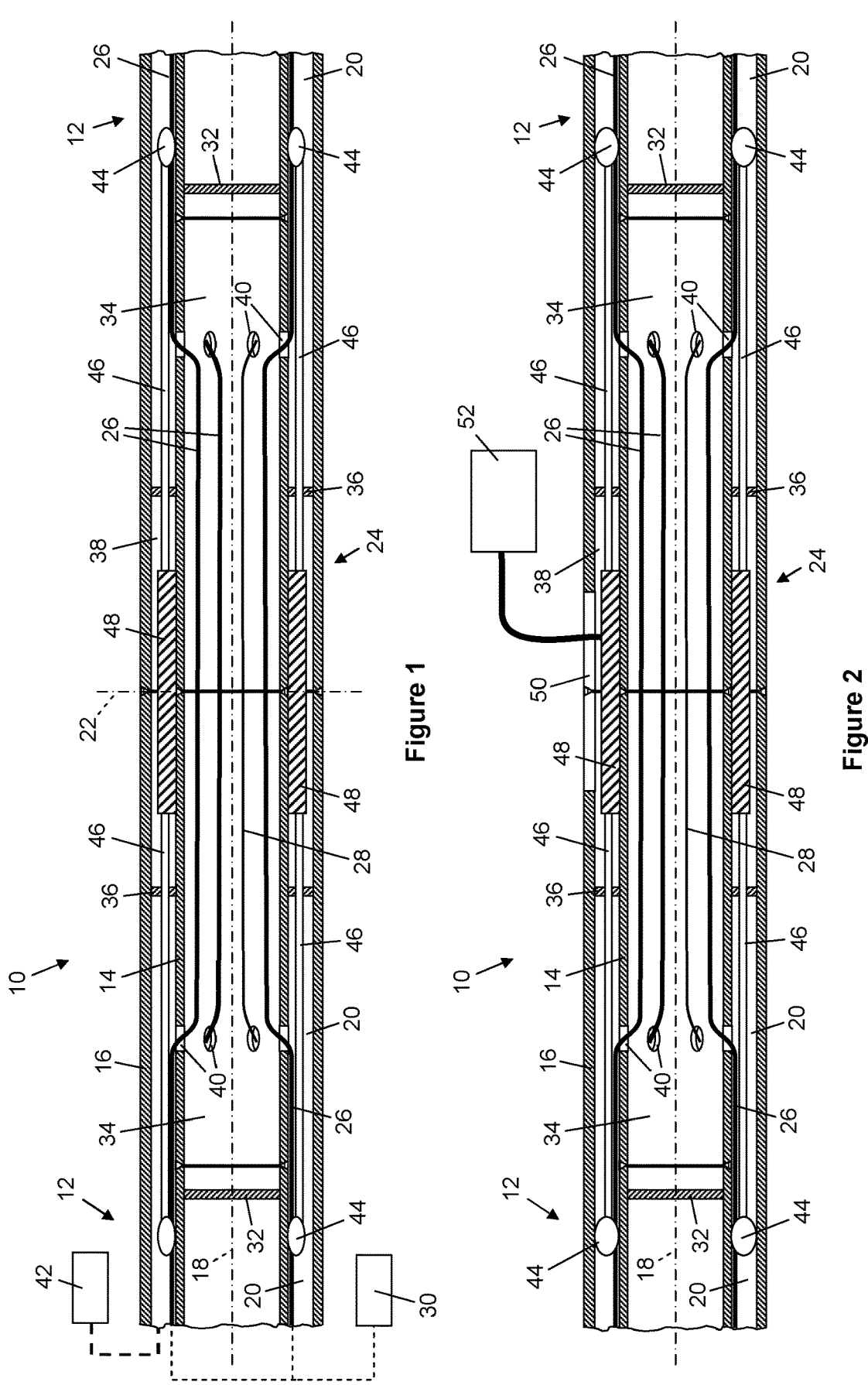

Referring firstly to FIG. 1, this drawing shows a transition section 10 of the invention that defines an interface between PiP pipelines 12 connected end-to-end for successive spooling onto, or unspooling from, the same reel.

As is conventional, each pipeline 12 comprises an inner pipe 14 and an outer pipe 16 that are in concentric relation about a common central longitudinal axis 18. The inner pipe 14 serves as a flowline for hot fluids such as hydrocarbon production fluids. The inner pipe 14 is therefore held spaced apart from the outer pipe 16 to define a thermally-insulating annulus 20 between them.

The features of the transition section 10 are substantially symmetrical or mirrored about a central transverse plane 22 that is orthogonal to the central longitudinal axis 18.

The inner and outer pipes 14, 16 of each pipeline 12 are joined continuously to their counterparts in the other pipeline 12, either directly or via a double-walled tubular transition piece 24 that is welded to the facing ends of the pipelines 12 as shown here. For the purposes of the following description, it is convenient to regard the transition piece 24 as being part of the pipelines 12 because its inner and outer walls are continuations of the respective inner and outer pipes 14, 16. In practice, it should be understood that the features of the transition section 10 may be embodied in facing end portions of the pipelines 12 and/or in a transition piece 24 that is disposed between the facing ends of the pipelines 12.

The inner and outer pipes 14, 16 are both conventionally fabricated of steel as shown here, although at least the outer pipe 16 could instead be made of a fibre-reinforced polymer composite material such as a thermoplastic composite pipe. Both steel pipes and composite pipes are regarded in the art as nominally rigid pipes, albeit that they are routinely bent along their length during spooling and installation and in use. Rigid pipes are distinguished in the art from flexible pipes such as unbonded flexible pipelines that have a layered wall structure of steel reinforcements alternating with flexible impermeable membranes. Relative to rigid pipes, flexible pipes have a much smaller minimum bending radius and they experience minimal elastic recovery once they are bent along their length.

Resistive wires or cables that serve as electrical trace-heating elements 26 extend along the annulus 20 in thermal contact with the outside of the inner pipe 14. The heating elements 26 may have various configurations, for example extending parallel to the central longitudinal axis 18 or twisting helically around the central longitudinal axis 18.

Typically, the annulus 20 will also contain a thermally-insulating material wrapped around or layered onto the inner pipe 14 on the radially outer side of the heating elements 26. However, such a material has been omitted from these drawings for clarity.

The invention is concerned not only with the continuity and integrity of the heating elements 26 but also with other cables that extend along the pipelines, including data cables and power cables. In this example, a fibre-optic cable 28 also extends along the annulus 20 beside the heating elements 26.

The heating elements 26 and other cables of the pipelines 12 are connected to each other to convey electrical current or data between the pipelines 12 as the case may be.

For example, the heating elements 26 and the fibre-optic cable 28 could extend continuously from one pipeline 12 to the next, as shown here. Alternatively, intermediate cables could effect electrical and data connections between the heating elements 26 and other cables of the respective pipelines. For clarity, references to the heating elements 26, the fibre-optic cable 28 or other cables in the following description include any such intermediate cables.

Advantageously, the continuous connections between the heating elements 26 and the fibre-optic cables 28 of the pipelines 12 allows their integrity to be monitored continuously by a monitoring system 30 that is connected to those cables at a single point along the combined length of the pipelines 12.

Most conveniently, the monitoring system 30 is connected to the heating elements 26 and the fibre-optic cable 28 at a trailing end of the conjoined pipelines as shown schematically in FIG. 1. This allows monitoring to be performed continuously, even where one of the pipelines 12 is spooled on a reel and is concealed under coils of the other pipeline 12 spooled on the same reel.

Fluid communication between the inner pipes 14 of the pipelines 12 is blocked by a pair of disc-shaped blocking plates 32 that close the inner pipes 14. One blocking plate 32 extends across and seals the lumen of each inner pipe 14. The blocking plates 32 are spaced apart longitudinally to define an inner chamber 34 between them, sealed off from the remainder of the inner pipes 14 outboard of the blocking plates 32.

In this example, the conjoined annuli 20 are also closed by a pair of annular blocking plates or rings 36. One of the blocking rings 36 extends across and seals the annulus 20 of each pipeline 12. The blocking rings 36 are spaced apart longitudinally to define an outer chamber 38 between them. The longitudinal spacing between the blocking rings 36 is less than the longitudinal spacing between the blocking plates 32.

Consequently, the outer chamber 38 is shorter than the inner chamber 34 in the longitudinal direction, meaning that the ends of the inner chamber 34 overlap longitudinally beyond the ends of the outer chamber 38.

The annulus blocking plates 32 and the blocking rings 36 may be either integral with a forged piece of pipe, such as a bulkhead, or welded to the inner pipe 14 and/or the outer pipe 16 to ensure airtight sealing.

The annuli 20 of the pipelines 12 are in fluid communication with the inner chamber 34 through openings or holes 40 that penetrate the wall of the inner pipe 14 at longitudinal positions between the blocking rings 36 and the blocking plates 32. The holes 40 communicate with longitudinally-outboard portions of the annulus 20 of the transition section 10. Thus, the annuli 20 are in fluid communication with each other via the inner chamber 34 defined between the blocking plates 32. Advantageously, this allows a partial vacuum to be drawn down in the annuli 20 by a drawdown system 42 that is connected to the annulus 20 of one of the pipelines 12 at a single point along the combined length of the pipelines 12.

Most conveniently, the drawdown system 42 is connected to the annulus 20 at a trailing end of the conjoined pipelines as shown schematically in FIG. 1. This allows drawdown of the conjoined annuli to be performed in a single operation, even where one of the pipelines is spooled on a reel and is concealed under coils of the other pipeline spooled on the same reel.

The heating elements 26 and the fibre-optic cable 28 are diverted through the wall of the inner pipe 14 from each annulus 20 through the inner chamber 32 and back into the other annulus 20, hence bypassing the outer chamber 38 where the annuli 20 are closed by the blocking rings 36. Conveniently, the same holes 40 that effect fluid communication between the annuli 20 and the inner chamber 32 enable these bypassing diversions. Thus, the holes 40 are angularly distributed in longitudinally-spaced groups disposed outboard of the blocking rings 36 and inboard of the blocking plates 32, and are oversized relative to the diameter of the heating elements 26 and the fibre-optic cable 28 that extend through them. However, different holes through the wall of the inner pipe 14 could provide for the respective functions of fluid communication and cable diversion if preferred.

The annuli 20 contain expandable seals 44, for example pneumatically-activated bladders that are inflated by high-pressure air via respective hoses 46 serving as activation links. Each seal 44 may comprise a non-return valve that permits inflation but prevents deflation of the seal 44. The hoses 46 extend through bores in the blocking rings 38 to connect the seals 44 to a seal inflation module 48 that is accommodated within the outer chamber 38 defined between the blocking rings 36, the inner pipe 14 and the outer pipe 16. The seal inflation module 48 serves as a seal activation system, or as part of such a system.

When the seals 44 are deflated as shown in FIG. 1, fluid communication is maintained between the annuli 20 of the pipelines 12 via the inner chamber 32. This allows single-point drawdown of a partial vacuum in the conjoined annuli 20 as described above. Conversely, when the seals 44 are inflated as shown in FIGS. 2 and 3, the annuli 20 of the pipelines 12 are sealed and isolated from each other, hence maintaining the partial vacuum in the respective annuli 20 even when the pipelines 12 are separated for installation by cutting through the transition section 10.

The seal inflation module 48 can be activated in various ways. For example, FIG. 2 shows the outer pipe 16 bored through or cut away at 50 to access the outer chamber 38, whereby an activation system 52 can be coupled to the seal inflation module 48. In this respect, it will be noted that the outer pipe 16 can be penetrated without comprising the partial vacuum in the annuli 20 of the pipelines 12 and the inner chamber 32, which are isolated from the outer chamber 38 by the blocking rings 36 and the inner pipe 14.

The activation system 52 could, for example, comprise a power supply to power an air pump in the seal inflation module 48. Alternatively, the inflation system 52 could itself comprise an air pump and so could supply a flow of high-pressure air to the seal inflation module 48, which would therefore serve as a manifold connecting the hoses 46 of the seals 44.

Figures 3, 4, 5:
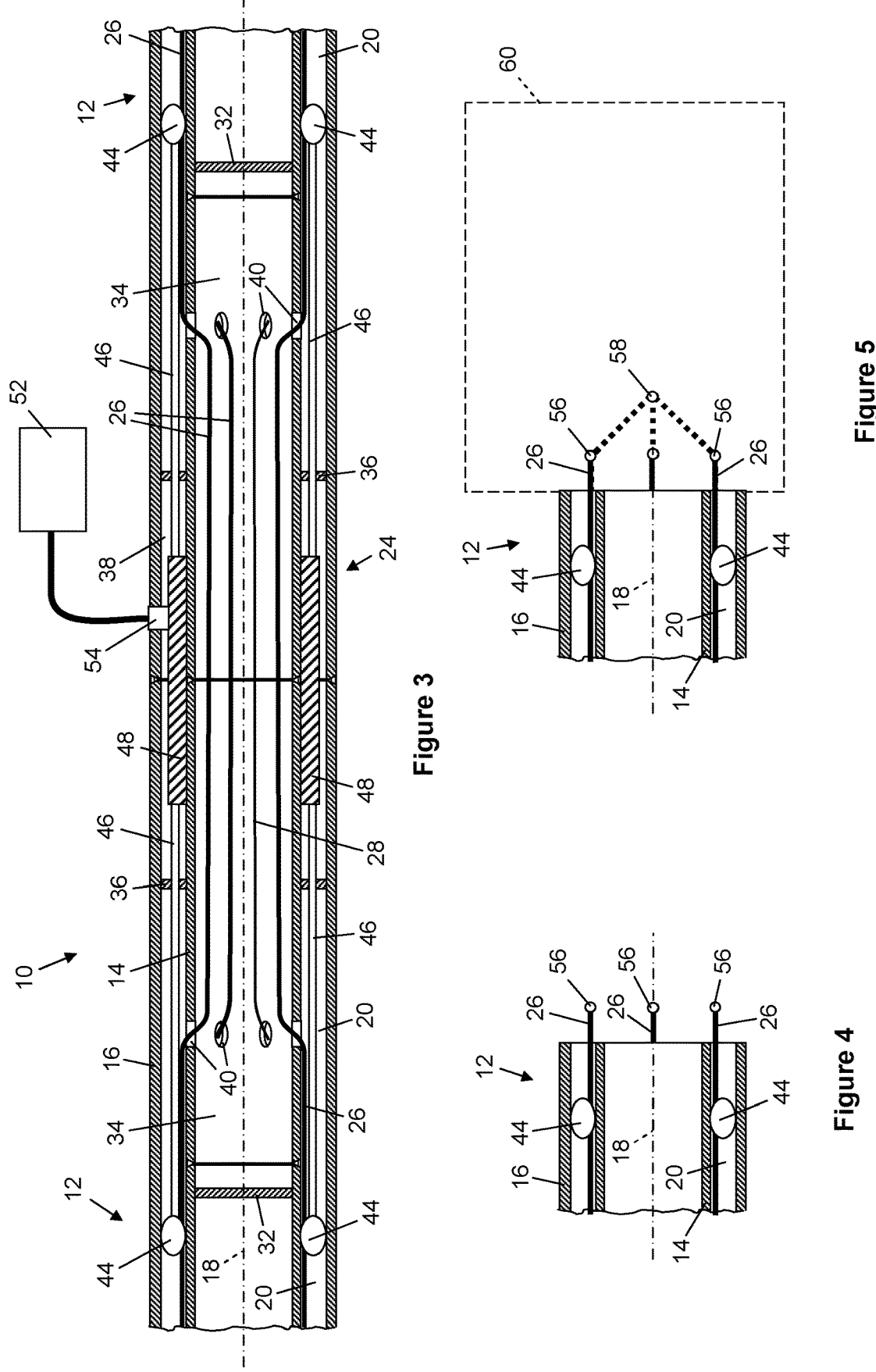
FIG. 4 is a schematic side view in longitudinal section of an end portion of one of the pipelines shown in FIG. 1 after the annulus has been sealed and the transition section has been cut away.
FIG. 5 shows the end portion of the pipeline of FIG. 4 now attached to a termination structure and heating wires of the pipeline connected together as a star end.

FIG. 3 shows another way of activating the seal inflation module 48, namely to provide air or power from an activation system 52 via a port 54 that penetrates the wall of the outer pipe 16 in alignment with the outer chamber 38. In principle, if the port 54 could provide access to the seal inflation module 48 without comprising the partial vacuum in the annuli 20 of the pipelines 12 and the inner chamber 32, the blocking rings 36 could be omitted in this embodiment.

Eventually, the pipelines 12 must be separated from each other for installation. In this respect, the last pipeline 12 to be spooled is the first pipeline 12 to be unspooled on board an installation vessel at a first installation site, whereupon the pipelines 12 are separated by cutting through the transition section 10. The resulting cut end of one of the pipelines 12 is shown in FIG. 4. It will be noted that the pipeline 12 is cut outboard of the holes 40 but inboard of the seals 44, which remain inflated to maintain the partial vacuum drawn down in the annulus 20. The remainder of the transition section 10 has been removed. This includes the blocking plates 32, which May conveniently be removed from the inner pipe 14 simply by cutting through the pipelines 12 outboard of the blocking plates 32.

The heating elements 26 and the fibre-optic cable 28 are also cut and may be provided with terminals 56 on their free ends to make new connections, for example a star end connection 58 between the heating elements 26 as shown schematically in FIG. 5. In this respect, where electrical trace-heating system are powered by a three-phase electrical supply, groups of three heating elements 26 are employed, one for each phase. The star end connection 58 is a neutral point formed by a wye connection at an end of the group, where the heating elements 26 are connected together in short-circuit. It is also possible for the heating elements 26 to be connected electrically by a metallic ring that encircles the inner pipe 14.

FIG. 5 also shows a termination structure 60 such as a pipeline end termination (PLET) that is welded to the cut end of the pipeline 12 before the pipeline 12 is abandoned to the seabed. The seals 44 are shown still inflated in FIG. 5 but they could be deflated or left to deflate over time, once the termination structure 60 has been welded onto the pipeline 12 to close the open end of the annulus 20 and so to maintain the partial vacuum therein.

Figures 6, 7A, 7B:
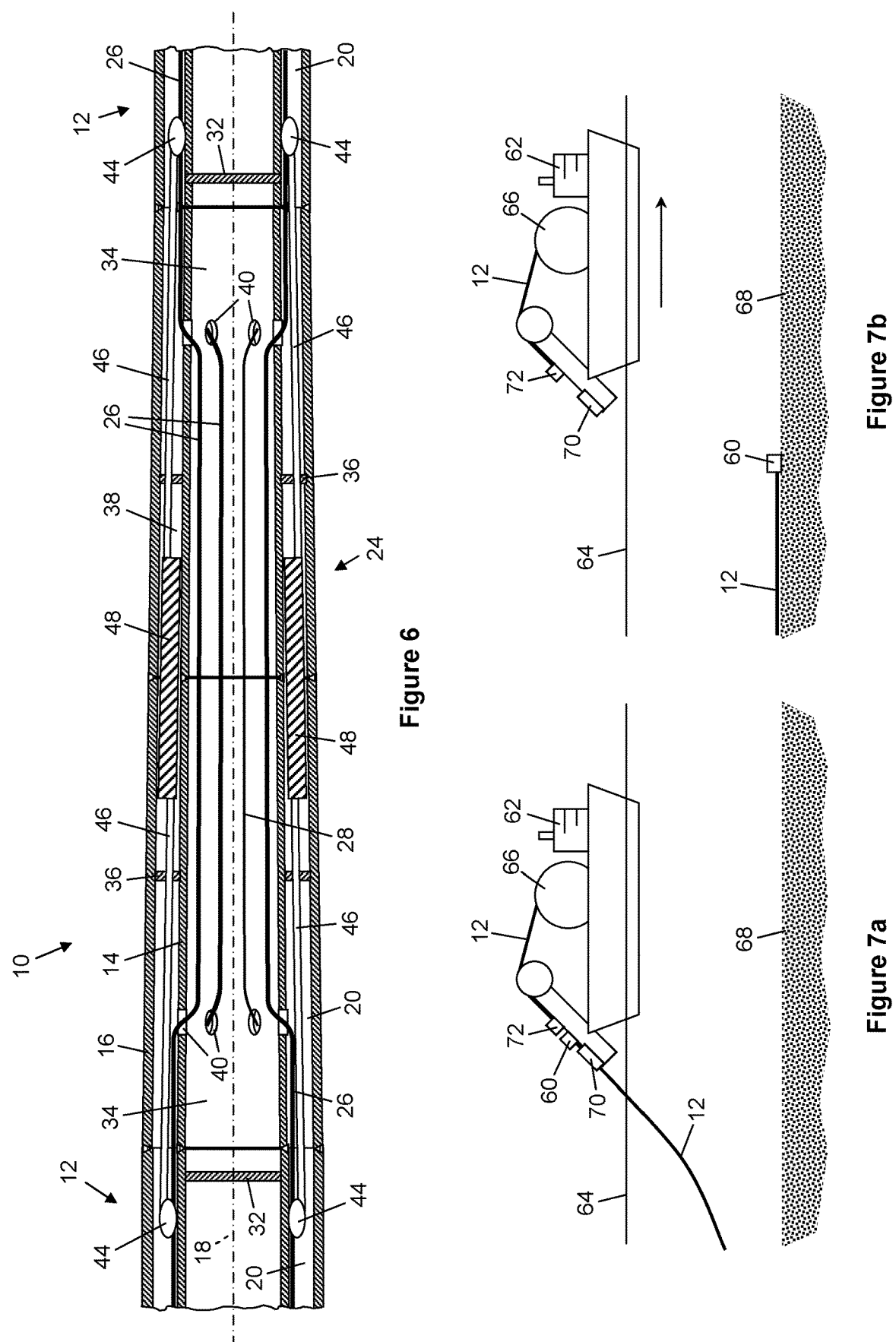
FIG. 6 is a schematic side view in longitudinal section of a transition section of the invention that tapers between pipelines of different diameters.
FIGS. 7a and 7b are schematic side views of a reel-lay vessel installing first and second pipelines that were joined by a transition section of the invention and spooled successively onto a reel of the vessel.

FIG. 6 shows a variant of the transition section 10 in which like numerals are used for like features. Here, the transition piece 24 tapers from a first pipeline 12 of greater diameter to a second pipeline 12 of lesser diameter. The transition piece 24 could instead have a stepped profile rather than a smoothly-tapered profile as shown here. In either case, the transition piece 24 facilitates drawdown, maintains low pressure in the annulus 20, assures cable integrity, and handles the mechanical transition between pipelines 12 of different diameters.

Finally, FIGS. 7a and 7b show a reel-lay installation vessel 62 at the surface 64 carrying first and second pipelines 12 spooled successively onto a reel 66 of the vessel 62.

In FIG. 7a, the vessel 62 is nearing the end of the process of installing the first pipeline 12 onto the seabed 68. The transition section 10 between the first and second pipelines 12 has been unspooled from the reel 66 and cut away. A termination structure 60 is welded to the cut upper end of the first pipeline 12 while the weight of the first pipeline 12 is suspended from a hang-off system 70 of the vessel 62. Before installation of the second pipeline 12 can begin, an initiation structure 72 is welded to its lower end as shown.

In FIG. 7b, the vessel 62 has abandoned the first pipeline 12 onto the seabed 68 and is shown travelling to a second installation site at which the second pipeline 12 will be unspooled from the same reel 66 and installed on the seabed 68.

Many variations are possible within the inventive concept. For example, heating elements could be integrated into the walls of the inner pipes and connected electrically by intermediate cables that extend across the interface between the pipelines.

The seals could be expanded other than pneumatically, such as electrically or hydraulically.

The expandable seals could be replaced by sealing partitions that close the annuli and that accommodate the heating elements in sealed bores. Such partitions could have valves to control fluid flow through the partitions, the valves being opened for drawdown of the conjoined annuli and then closed to allow the pipelines to be separated. The valves could be operated electrically, pneumatically, hydraulically, or mechanically by activation methods akin to those shown in FIGS. 2 and 3.

The invention claimed is:

1. Electrically trace-heated pipe-in-pipe pipelines joined end-to-end via a transition section, wherein the transition section comprises:

an inner pipe and an outer pipe spaced radially from the inner pipe;

an annulus defined between the inner and outer pipes, the annulus of the transition section containing heating cables that extend longitudinally between annuli of the pipelines and also containing longitudinally spaced seals that are switchable between a deactivated state to effect fluid communication between the annuli of the pipelines and an activated state to isolate the annuli of the pipelines from each other;

longitudinally spaced blocking plates that close a lumen of the inner pipe and define an inner chamber between them; and longitudinally spaced openings that penetrate a tubular wall of the inner pipe at locations longitudinally inboard of the blocking plates and the seals to effect fluid communication between the annulus of the transition section and the inner chamber and to define a diversion path for the heating cables that extends from the annulus of the transition section to the inner chamber and back to the annulus of the transition section.

2. The pipelines of claim 1, wherein the same openings effect said fluid communication between the annulus of the transition section and the inner chamber and define the diversion path for the heating cables.

3. The pipelines of claim 2, wherein the openings are oversized relative to the heating cables to allow said fluid communication around the heating cables extending though the openings.

4. The pipelines of claim 1, further comprising at least one data cable extending beside the heating cables between the annuli of the pipelines along the diversion path via the inner chamber.

5. The pipelines of claim 1, wherein the seals of the transition section are inflatable seals that are deflated in the deactivated state to allow bypass of fluid along the annulus of the transition section and are inflated in the activated state to close the annulus of the transition section.

6. The pipelines of claim 1, wherein the transition section is implemented by a transition piece that is joined to facing ends of the pipelines.

7. The pipelines of claim 6, wherein the pipelines differ from each other in diameter and the transition piece tapers or steps in diameter from a larger diameter at one end to a smaller diameter at an opposed end.

8. The pipelines of claim 1, wherein the annulus of the transition section contains an activation system for activating the seals.

9. The pipelines of claim 8, further comprising a port extending though a tubular wall of the outer pipe to power the activation system.

10. The pipelines of claim 8, further comprising activation links that extend longitudinally within the annulus of the transition section between the activation system and the seals.

11. The pipelines of claim 1, wherein the transition section further comprises blocking rings that close the annulus of the transition section at locations longitudinally inboard of the openings to define an outer chamber between the blocking rings that is isolated from the inner chamber.

12. The pipelines of claim 11, wherein the outer chamber of the transition section contains an activation system for activating the seals.

13. The pipelines of claim 12, further comprising activation links that extend longitudinally within the annulus of the transition section between the activation system and the seals, wherein the activation links extend through the blocking rings.

14. The pipelines of claim 1, further comprising a monitoring system that is connected to the heating cables at an end of the combined length of the pipelines.

15. The pipelines of claim 14, when spooled together on a reel in succession, wherein the monitoring system is connected to the heating cables at a leading end coupled to the reel or at a trailing end remote from the reel.

16. The pipelines of claim 14, further comprising a drawdown system that is in fluid communication with the annulus of one of the pipelines at an end of the combined length of the pipelines.

17. The pipelines of claim 16, when spooled together on a reel in succession, wherein the drawdown system is connected to said annulus at a leading end coupled to the reel or at a trailing end remote from the reel.

18. A method of preparing electrically trace-heated pipe-in-pipe pipelines connected end-to-end via a transition section, the transition section comprising a radially inner pipe and a radially outer pipe that are connected to, or continuations of, radially inner and outer pipes of the pipelines respectively, the method comprising drawing down a partial vacuum in annuli of the pipelines when the annuli are in mutual fluid communication via an inner chamber in the radially inner pipe of the transition section, which inner chamber is isolated from the radially inner pipes of the pipelines.

19. The method of claim 18, comprising drawing down the partial vacuum before, during or after spooling the pipelines and the transition section onto a reel.

20. The method of claim 19, further comprising:

unspooling a first of the pipelines and the transition section from the reel;

activating longitudinally-spaced seals in an annulus of the transition section to isolate the annuli of the pipelines from the inner chamber and from each other, each of the annuli of the pipelines thereby separately capturing the drawn-down partial vacuum; and cutting through the transition section at one or more longitudinal positions between the seals to separate the pipelines from each other.

21. The method of claim 20, comprising cutting or boring into the radially outer pipe of the transition section to provide access for activating the seals.

22. The method of claim 20, comprising connecting an external source to a port in the radially outer pipe of the transition section to activate the seals.

23. The method of claim 18, comprising removing blocking plates from the radially inner pipe of the transition section, which blocking plates define ends of the inner chamber.

24. The method of claim 23, comprising removing the blocking plates by cutting through the radially inner pipe of the transition section.

25. The method of claim 18, further comprising continuously monitoring the integrity of cables of the pipelines while spooling the pipelines and the transition section onto a reel and when unspooling the pipelines and the transition section from the reel.

26. The method of claim 25, comprising conveying electrical current or data signals along the cables via the inner chamber in the radially inner pipe of the transition section.

27. The method of claim 25, comprising cutting the cables of at least one of the pipelines and effecting a star end connection between them.

28. The method of claim 18, further comprising welding a termination head to a cut end of a first of the pipelines to be unspooled.

29. The method of claim 18, further comprising welding an initiation head to a cut end of a second of the pipelines to be unspooled.

30. A method of installing electrically trace-heated pipe-in-pipe pipelines connected end-to-end via a transition section, the transition section comprising a radially inner pipe and a radially outer pipe that are connected to, or continuations of, radially inner and outer pipes of the pipelines respectively, the pipelines having been prepared by drawing down a partial vacuum in annuli of the pipelines when the annuli are in mutual fluid communication via an inner chamber in the radially inner pipe of the transition section, which inner chamber is isolated from the radially inner pipes of the pipelines, the method comprising:

abandoning a first of the pipelines to the seabed;

unspooling a second of the pipelines; and installing the second pipeline on the seabed at a location different to the first pipeline.

* * * * *